US010151581B2

(12) United States Patent
Colle et al.

(10) Patent No.: US 10,151,581 B2
(45) Date of Patent: Dec. 11, 2018

(54) METHOD AND DEVICE FOR DETERMINING THE POSITION AND ORIENTATION OF A SPECULAR SURFACE FORMING A DIOPTER (71) Applicants: MSC & SGCC, Vourles (FR); UNIVERSITE DIJON BOURGOGNE, Dijon (FR)

(72) Inventors: Olivier Colle, Oullins (FR); Marc Leconte, Loire sur Rhone (FR); Florence Drouet, Bures sur Yvette (FR); Olivier Aubreton, Saint Berain sous Sanvigne (FR); Olivier Laligant, Saint-Firmin (FR); Christophe Stolz, Le Creusot (FR)

(73) Assignees: MSC & SGCC, Vourles (FR); UNIVERSITE DIJON BOURGOGNE, Dijon (FR)

( * ) Notice: Subject to any disclaimer, the term of this patent is extended or adjusted under 35 U.S.C. 154(b) by 299 days.

(21) Appl. No.: 14/912,632

(22) PCT Filed: Aug. 21, 2014

(86) PCT No.: PCT/FR2014/052108
§ 371 (c)(1),
(2) Date: Feb. 18, 2016

(87) PCT Pub. No.: WO2015/028746
PCT Pub. Date: Mar. 5, 2015

(65) Prior Publication Data
US 2016/0202039 A1   Jul. 14, 2016

(30) Foreign Application Priority Data
Aug. 30, 2013   (FR) ..................... 13 58355

(51) Int. Cl.
*G01B 11/06*   (2006.01)
*G06T 7/514*   (2017.01)
(Continued)

(52) U.S. Cl.
CPC .......... *G01B 11/0641* (2013.01); *G01B 11/06* (2013.01); *G01B 11/24* (2013.01);
(Continued)

(58) Field of Classification Search
CPC ..... G01B 11/03; G01B 11/06; G01B 11/0616; G01B 11/0641; G01B 11/16; G01B 11/22;
(Continued)

(56) References Cited

U.S. PATENT DOCUMENTS 5,028,138 A    7/1991  Wolff
6,806,459 B1 * 10/2004  Ringlien ............ G01B 11/0691
                                                209/524
(Continued)

OTHER PUBLICATIONS

Ivo Ihrke et al., "Transparent and specular object reconstruction", published in Computer Graphics Forum 2010, vol. 29, No. 8, pp. 2400-2426.
(Continued)

*Primary Examiner* — Gordon J Stock, Jr.
(74) *Attorney, Agent, or Firm* — Clark & Brody (57) ABSTRACT A method of determining the position and the orientation of at least one interface comprises illuminating the interface that is determined with at least one non-polarized diffuse light source point, using an image-forming device to acquire an image enabling polarization information determined about the reflection(s) of the source point on the interface to be determined, and in the image, locating any reflection of the light source point as reflected by the interface. For each located reflection, the light ray reaching the image-forming
(Continued)

device together with at least its degree of polarization as its polarization parameter is calculated. The light ray as reflected on the interface that to be determined is calculated. Using the light ray reflected on the interface, its polarization parameter, and the known position of the source point, the position and the orientation of the surface element is deduced.

17 Claims, 5 Drawing Sheets

(51) Int. Cl.
  *G01B 11/25* (2006.01)
  *G06K 9/20* (2006.01)
  *G01B 11/24* (2006.01)

(52) U.S. Cl.
  CPC ............ *G01B 11/25* (2013.01); *G01B 11/254* (2013.01); *G01B 11/2522* (2013.01); *G06K 9/2036* (2013.01); *G06T 7/514* (2017.01)

(58) Field of Classification Search
  CPC ..... G01B 11/24; G01B 11/2408; G01B 11/25; G01B 11/2513; G01B 11/2518; G01B 11/2522; G01B 11/254; G06T 7/50; G06T 7/514; G06T 7/521; G06T 7/55; G06T 7/557; G06T 7/564; G06T 7/70; G06K 9/2036
  See application file for complete search history.

(56) References Cited

U.S. PATENT DOCUMENTS

| | | | |
|---|---|---|---|
| 7,880,898 B2* | 2/2011 | Jeannot | G01B 11/08 356/601 |
| 9,244,020 B2* | 1/2016 | Leconte | G01B 11/06 |
| 2010/0290713 A1 | 11/2010 | Kanamori et al. | |
| 2011/0038526 A1 | 2/2011 | Czarnotta et al. | |

OTHER PUBLICATIONS

Christophe Stolz et al., "Shape from polarization: a method for solving zenithal angle ambiguity", Optics Letter 37, No. 20, 2012.
Atkinson et al., "Recovery of surface orientation from diffuse polarization", vol. 15, No. 6, Jun. 2006.
Marco Tarini et al., "Shape from Distortion: 3D Range Scanning of Mirroring Objects", Siggraph 2002.

* cited by examiner

METHOD AND DEVICE FOR DETERMINING THE POSITION AND ORIENTATION OF A SPECULAR SURFACE FORMING A DIOPTER

FIELD OF THE INVENTION

The present invention relates to relates to the field of inspecting the dimensions of specular surfaces forming interfaces as presented by various articles such as, for example: glass packages, substrates made of glass or of silicon, polished metal parts, headlight reflectors, windows, vehicle windshields, or ophthalmic lenses.

BACKGROUND ART

In the state of the art, various methods are known for three-dimensionally reconstructing a specular surface of an article, as shown in the prior art such as "Transparent and specular object reconstruction" published in Computer Graphics Forum 2010 by Ivo Ihrke, Kiriakos N. Kutulakos, Hendrik P. A. Lensch, Marcus Magnor, and Wolfgang Heidrich.

By way of example, the article entitled "Shape from distortion: range scanning of mirroring objects" published in Siggraph 2002: Conference abstracts and applications (2002) by M. Tarini, H. P. A. Lensch, M. Goesele, and H. P. Seidel, edited by D. Roble, describes a method of three-dimensionally reconstructing specular surfaces based on the principle of observing the reflection of a known light pattern. That technique assumes surface continuity and proceeds by integration to work back to the shape of the article. That method is complex in terms of calculation, and it operates correctly only with a high density of measurement points, over surfaces without any major discontinuity and after setting correct initial values for starting the integration. That method, which requires complex calculations, is found to be difficult to perform in an industrial setting. Furthermore, that technique is not suitable for measuring a plurality of superposed surfaces in transparent media.

The article entitled "Shape from polarization: a method for solving zenithal angle ambiguity" (Christophe Stolz, Mathias Ferraton, Fabric Mériaudeau, Optics Letters 37, 20 (2012) 4218 describes a method of three-dimensionally reconstructing surfaces using an extended diffuse light source and information about the polarization of light reflected on the article. The orientations of normals to the external specular surface of an article are deduced from the polarization. That method thus requires an integration step in order to work back to the three-dimensional surfaces. That method operates correctly only with a high density of measurement points on surfaces without major discontinuity and by having correct initial values at the beginning of the integration. That method, which requires complex calculations, is found to be difficult to perform in an industrial setting. Furthermore, that technique is not suitable for measuring a plurality of superposed surfaces in transparent media.

In analogous manner, Documents U.S. Pat. No. 5,028,138 and US 2010/290713, and the publication by G. A. Atkinson et al. "Recovery of surface orientation from diffuse polarization" describe methods of reconstructing articles from polarization parameters. Nevertheless, the methods described in those documents present the same drawbacks as the technique described in the publication "Shape from polarization . . . ".

SUMMARY OF THE INVENTION

The invention relates more particularly to three-dimensionally measuring transparent articles made up of a plurality of superposed interfaces such as, for example: the walls of glass containers or stacked layers of laminated glass. An application of the present invention is to be able to reconstitute in three dimensions the outside surface of an article and also the inside surface of an article, and in particular of a glass container, thus making it possible to measure the thickness of the glass wall and to discover how the glass is distributed.

The present invention seeks to remedy the drawbacks of prior techniques by proposing a method of reconstructing a specular surface that can be obtained from a number of points that is small or of low density, avoiding any need to have recourse to a high density of measurement points, or even to provide the position and the orientation of the surface in the vicinity of a single one of its points.

Another object of the invention is to propose a method enabling superposed specular surfaces to be reconstructed in order to measure the thickness of multilayer articles.

Another object of the invention is to propose a method enabling specular surfaces to be reconstructed of articles that present high degrees of curvature or that are poorly positioned in order to enable in-line inspections to be performed.

In order to achieve such objects, the invention provides a method of determining the position and the orientation of at least one specular surface element forming an interface of an article having one or more superposed interfaces.

According to the invention, the method consists in:
  illuminating the interface that is to be determined with at least one non-polarized diffuse light source point, the position of said source point being known in three dimensions;
  using an image-forming device to acquire at least one image enabling polarization information to be determined about the reflection(s) of the source point on the interface that is to be determined; and
  in the image, locating any reflection of the light source point as reflected by the interface to be determined, and for each located reflection:
    calculating the light ray reaching the image-forming device together with at least its degree of polarization as its polarization parameter;
    calculating the light ray as reflected on the interface that is to be determined from the light ray reaching the image-forming device by calculating its deflections and changes of polarization induced on passing through any other known interface situated between the interface that is to be determined and the image-forming device; and
    using the light ray reflected on the interface that is to be determined, its polarization parameter, the known position of the source point, and any known interface interposed between the source and the interface to be determined, to deduce the position and the orientation of the surface element at the point of incidence on the interface that is to be determined.

In addition, the method of the invention may further consist in at least one and/or any other of the following additional characteristics:
  illuminating the interface that is to be determined with a plurality of light source points of positions that are known in three dimensions and that are identifiable in the image, so that by analyzing the reflections of each light source point it is possible to determine the positions and the orientations of a plurality of surface elements distributed at a plurality of locations on the interface that is to be determined;

illuminating the interface that is to be determined with one or more lines of light making it possible to determine the positions and the orientations of a plurality of surface elements distributed along the reflection(s) of the line(s) on the interface that is to be determined;

moving the article relative to the source and/or to the image-forming device, and during the movement acquiring a plurality of successive images, thereby making it possible by this scanning to determine the positions and the orientations of a plurality of surface elements distributed at a plurality of locations on the interface that is to be determined;

using a plurality of surface elements to reconstruct the three-dimensional shape of at least a portion of the surface of an interface of the article;

for a series of superposed interfaces, determining the position and the orientation of at least one surface element of an interface that is to be determined after previously and successively in the reverse order of passage by the reflected ray using the same method to calculate by approximation the positions and the orientations of the surface elements of the interfaces through which the rays pass in succession;

for a series of superposed interfaces, determining the position and the orientation of at least one surface element of an interface that is to be determined by previously and successively in the reverse order of passage by the reflected ray reconstructing the three-dimensional shapes of the surface portions of the interfaces through which the rays pass in succession;

after determining the positions and the orientations of two successive elements of two successive interfaces, determining the thickness of the transparent material between the two surface elements of the two interfaces;

determining the thickness distribution of the transparent material situated between the surface portions of two consecutive interfaces by determining the three-dimensional shape of a portion of the first interface and the three-dimensional shape of a portion of the second interface; and acquiring as an image enabling polarization information to be determined, an image containing at all points the intensity values of at least two components of the polarization vector of the received light.

The invention also provides a device for determining the position and the orientation of at least one specular surface element forming an interface of an article having one or more superposed interfaces, the device comprising:

a diffuse and pluridirectional light source illuminating the interface and including at least one source point of known position;

an image-forming device suitable for supplying at least one image enabling polarization information about the received light to be determined, and positioned in such a manner as to receive the reflections of the source point on the interface that is to be determined; and an image processor unit.

According to the invention, the processor unit:

locates in the image any reflection of the light source point as reflected by the interface that is to be determined, and in that, for each located reflection, the processor unit:

calculates the light ray reaching the image-forming device together with at least its degree of polarization as the polarization parameter;

calculates the reflected light ray as reflected on the interface that is to be determined from the light ray reaching the image-forming device by calculating its deflections and the changes in polarization induced by passing through any other known interface situated between the interface that is to be determined and the image-forming device; and from the light ray reflected on the interface that is to be determined, from its polarization parameter, from the known position of the point source, and from any known interface interposed between the source and the interface that is to be determined, deduces the position and the orientation of the surface element at the point of incidence on the interface that is to be determined.

In addition, the method of the invention may further consist in at least one and/or any other of the following additional characteristics:

the light source presents a plurality of light points of known positions, said points forming a set of disjoint point sources or a set of remarkable points of two-dimensional geometrical patterns carried on a light-emitting surface;

the light source presents at least one line of light;

a system for moving the article relative to the source and/or to the image-forming device;

the image acquisition device supplies at least two polarization components for each pixel by means of at least two sensing surfaces that are exposed simultaneously, the first receiving rays filtered by a polarizer oriented in a first direction and the second receiving rays filtered by a polarizer oriented in a second direction;

the image acquisition device supplies at least two polarization components for each pixel by means of a sensing surface that is exposed at least twice, the first time to receive rays filtered by a polarizer oriented in a first direction, and the second time to receive rays filtered by a polarizer oriented in a second direction, the orientation of the axis of the polarizer being modifiable, e.g. mechanically by rotation or electrically by controlling a liquid crystal device; and the image acquisition device includes a matrix sensing surface having a matrix filter placed thereon in which the unit filters are oriented in at least N different directions, where N is greater than or equal to 2, so as to measure polarization parameters of the light reaching the sensor by combining N neighboring pixels.

BRIEF DESCRIPTION OF THE DRAWINGS

Other characteristics appear from the following description made with reference to the accompanying drawings, which show implementations of the invention as non-limiting examples.

DETAILED DESCRIPTION OF THE INVENTION

The invention relates to a method and to a device I for dimensionally inspecting or measuring a surface element of an article A by observing so-called "specular" light reflections. A reflection is said to be specular when the incident light ray gives rise to a reflected light ray in a single direction in application of the Snell-Descartes law for reflection. In the specification below, any interface is considered as being a specular surface when the light used is reflected and refracted in a manner considered as being specular, i.e. such that the effects of diffusion and of absorption do not need to be taken into account.

The article A thus presents one or more superposed specular surfaces, each forming an interface. An interface is a surface or "diopter" between two media of different (real and/or imaginary) optical indices. For each interface, a surface element can be defined that corresponds to an elementary area around a point, which is defined by the coordinates of the point and the normal to the surface at the point. A surface or interface portion of an article corresponds to taking a plurality of surface elements into account. The three-dimensional shape of an interface corresponds to a surface portion or to an entire surface defined by its parametric equations, or indeed by a description in terms of finite elements, i.e. account is taken of the 3D coordinates of points belonging to the surface and/or of the orientations of surface elements making it up, or of their normals, or indeed of their curvatures.

The term "orientation" is used of a surface element to mean the equation in three-dimensional space for the normal to the surface, or else the three components of the vector that is normal to the surface. Likewise, any light ray calculation involves determining the equation of the geometrical line or line segments followed by said light ray.

For clarity in the description relating to Stokes-Mueller formalism, reference may be made for example to the book entitled "Polarized light" by Dennis H. Goldstein (Polarized Light, CRC Press; 3rd edition, Dec. 16, 2010, ISBN-10: 1439830401).

Figure 1:
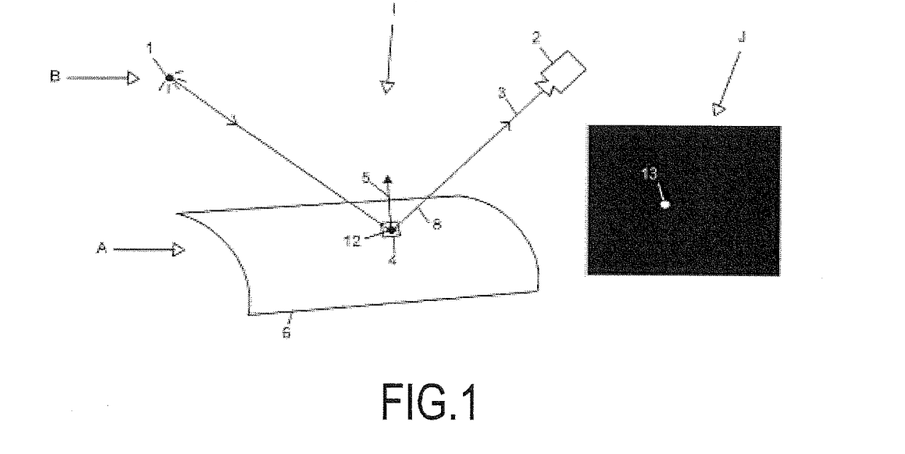
FIG. 1 is a diagram for when no known interface is interposed between the source and the interface that is to be determined.

In the implementation shown in FIG. 1, the device I of the invention serves to determine the position and the orientation of at least one specular surface element forming an interface of an article A that has a single interface.

Figure 2:
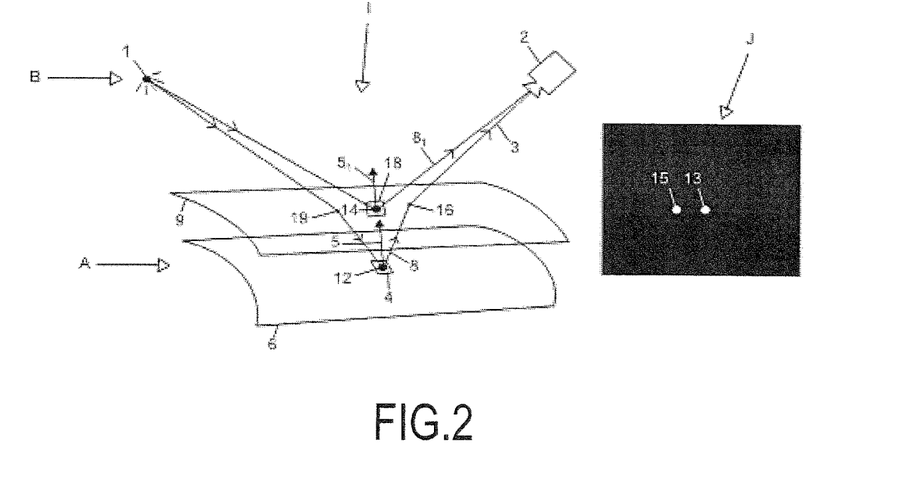
FIG. 2 is a diagram for when a known interface is interposed between the source and the interface that is to be determined.

In the implementation shown in FIG. 2, the device I of the invention serves to determine the position and the orientation of at least one specular surface element forming an interface of an article A having two superposed interfaces.

In general manner, the device I of the invention comprises:

- a source B of non-polarized diffuse and pluridirectional light illuminating the interface of the article A that is to be determined or to be characterized, the light source comprising at least one point source 1 of position that is known in three dimensions;
- an image-forming device 2 suitable for forming at least one image J enabling polarization information of the received light to be determined, and positioned in such a manner as to receive reflections of the source point 1 on the interface that is to be determined, and enabling position information to be determined about points of specular reflection of the point source 1 on the interface that is to be determined; and
- an image processor unit (not shown) that is connected to the image-forming device 2.

Figure 5:
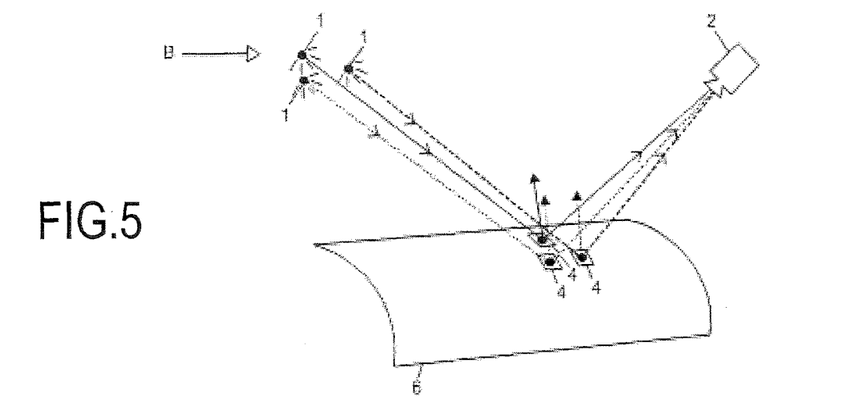
FIG. 5 is a diagram when the source presents a plurality of points of known positions for determining a plurality of surface elements distributed at a plurality of locations on the interface that is to be determined.
Figure 6:
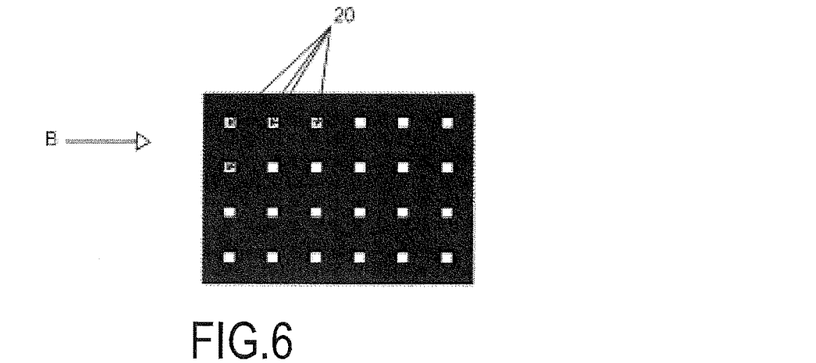
FIG. 6 shows a set of remarkable points belonging to geometrical patterns of a light source.

The diffuse light source B is a source emitting non-polarized light in an emission cone of greater or smaller size. This light source B, which may be made in any appropriate manner, is of diverging, non-collimated, point, and non-polarized type. This light source B has a single source point 1 as shown in FIG. 1 or a plurality of source points 1 as shown in FIG. 5. The positions of the various source points 1 are known in three dimensions. For example, these various source points are constituted by a set of disjoint point sources such as light-emitting diodes or by a set of remarkable points 20 (FIG. 6) of two-dimensional geometric patterns carried by a light-emitting surface. These remarkable points 20 are points that are unambiguously defined, e.g. by the corner of a geometrical shape such as a square, a rectangle, or a triangle, the center of a circle of small size. It should be understood that the source point 1 is remarkable insofar as it is easy to find the point and to determine its x,y position in the image by using computer means to analyze a direct or indirect image of the source.

In another variant implementation, the light source B presents at least one line of light.

The image-forming device 2 comprises a camera suitable for supplying at least one image enabling polarization information to be determined about the received light. The term "polarization information" covers at least the degree of polarization of the light ray.

As an image suitable for determining polarization information, it is possible to take an image containing at all points the intensity values of at least two components of the polarization vector of the received light. The term "components of the polarization vector" is used to mean the intensities of the projections of the polarization vector that results from the effect of a polarizer oriented in different directions, preferably selected so as to optimize the accuracy with which polarization parameters are calculated. It should be observed that a polarization state as determined by means of only two components, preferably orthogonal components, is not complete unless an assumption is made, e.g. such as the orientation of the surface that is to be determined is known in a direction or dimension of three-dimensional space. It is therefore advantageous when determining polarization information to take account of at least three components of the polarization vector of the received light.

In a first implementation, the image acquisition device 2 supplies, for each pixel, at least two polarization components, by means of at least two sensing surfaces that are exposed simultaneously, the first receiving rays filtered by a polarizer oriented in a first direction and the second receiving rays filtered by a polarizer oriented in a second direction.

In another implementation, the image acquisition device 2 supplies, for each pixel, at least two polarization components, using a single sensing surface that is exposed at least twice, the first time receiving rays filtered by a polarizer oriented in a first direction, and the second time receiving rays filtered by a polarizer oriented in a second direction, it being possible for the axis of the polarizer to be modified e.g. mechanically by being rotated or electrically by controlling a liquid crystal device.

In another implementation, the image acquisition device 2 has a matrix sensing surface having placed thereon a matrix filter in which the individual filters are oriented in at least N different directions, where N is greater than or equal to two, so as to measure polarization parameters of the light reaching the sensor, by combining N neighboring pixels.

The person skilled in the art can easily adapt embodiments of the image acquisition device 2 to obtaining some number of components that is greater than two in order to determine the polarization information more completely and more accurately.

The characteristics of the image acquisition device 2 are known such as, in particular, all of the intrinsic and extrinsic parameters of a camera, which the person skilled in the art knows how to define and obtain by a priori calibration, and how subsequently to use in performing three-dimensional geometrical calculations, e.g. using the Zhang model described in the publication by Z. Zhang entitled "A flexible new technique for camera calibration" published in IEEE Transactions on Pattern Analysis and Machine Intelligence, 22(11); 1330-1334, 2000.

The characteristics of the image acquisition device 2 thus comprise, by way of example:
the polarization directions of the filter(s);
the position of the optical center and the focal length of the objective lens;
the direction of the optical axis; and
the resolution in pixels per millimeter (mm), the orientation, and the scanning order of the optoelectronic sensor(s).

Naturally, the configuration of the device I, i.e. the position of the source point 1 and the characteristics of the image acquisition device 2, including its position, are adapted as a function of the article A so that the acquisition device can observe the specular reflections of the incident light rays emitted by the light source B and taking place on the interface(s) of the article A. In particular, when there are superposed interfaces, the reflections on each interface must be distinct in the image J and the angles of incidence on the interfaces of the incident light rays emitted by the light source B must correspond to a degree of polarization that is easy to measure, typically in the range 20° to 55°, for glass.

In order to understand the invention, account is taken of the absence or the presence of interfaces between the light source B and the interface that is to be determined. The principle of the invention makes it possible to determine or characterize an interface either if no interface is interposed between the light source B and the interface that is to be determined, or else if one or more known interfaces are interposed between the light source B and the interface to be determined, with this or these interfaces being known by means of the method of the invention or by some other method. An interface is said to be "known" when knowledge is available about the optical indices of both sides of the interface and about the shape and the position of an element of its surface, of a portion of its surface, or of its complete three-dimensional shape.

Figure 3:
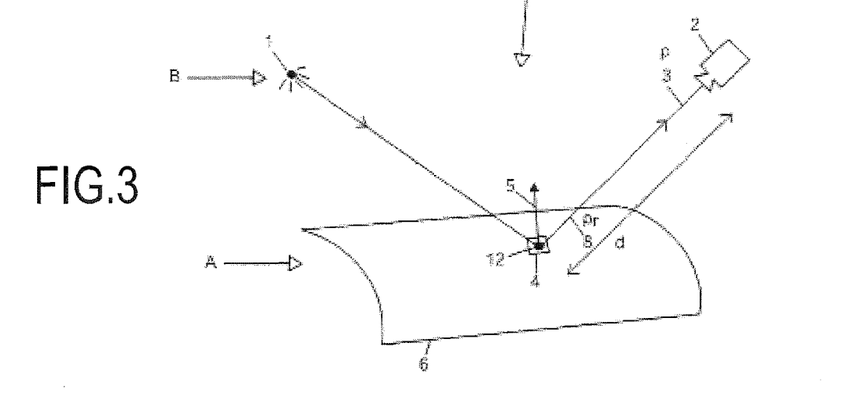
FIG. 3 is a diagram showing measurement when no known interface is interposed between the source and the interface that is to be determined.

FIGS. 1 and 3 show the principle of the invention when no interface is interposed between the light source B and the interface 6 that is to be determined or characterized. The incident light ray coming from the source point 1 is reflected on a specular surface element 4 of the interface 6 that is to be determined at a point of incidence 12 in order to give rise to a ray 8 that is reflected on the interface 6 that is to be determined. The angle formed between the incident ray and the normal 5 of the surface element 4 is equal to the angle formed between the reflected ray 8 and the normal 5 of the surface element 4. The image J acquired by the image acquisition device 2 comprises one light point, i.e. the reflection 13 of the source point 1 by the interface 6 that is to be determined. This reflection 13 in the image corresponds directly to the point of incidence 12 seen by the image acquisition device 2. This reflection 13 in the image is obtained by the ray 3 reaching the image acquisition device 2 and presenting a degree of polarization $\rho$.

Figure 4:
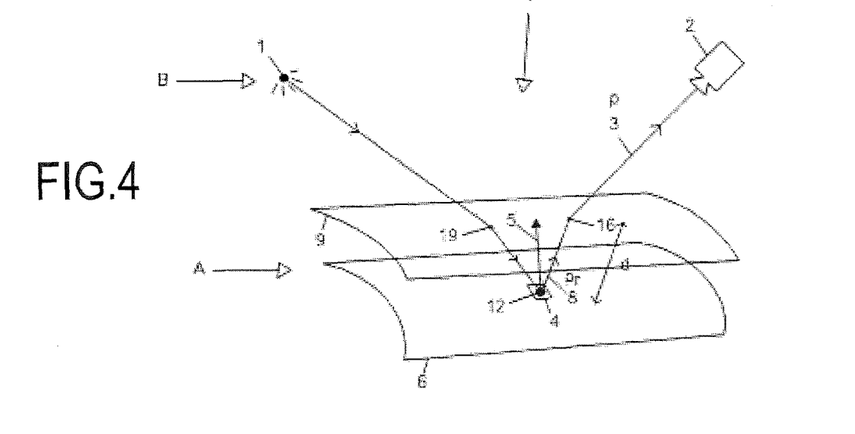
FIG. 4 is a diagram showing measurements when a known interface is interposed between the source and the interface that is to be determined.

FIGS. 2 and 4 show the principle of the invention when a known interface 9 is interposed between the light source B and the interface 6 that is to be determined or characterized. In this variant implementation, the image J acquired by the image acquisition device 2 has a plurality of light points corresponding to the reflections of light on the known interface 9 and on the interface 6 that is to be determined. The image J thus has a reflection 15 on the known interface 9 and the reflection 13 on the interface 6 that is to be determined.

An incident ray coming from the source point 1 is reflected on a specular surface element 18 of the known interface 9 at a point of incidence 14 in order to give rise to a reflected ray $8_1$ on the known interface 9. The angle formed between the incident ray and the normal $5_1$ of the surface element 18 is equal to the angle formed between the reflected ray $8_1$ and the normal $5_1$ of the surface element 18. The image J acquired by the image acquisition device 2 includes the light point, i.e. the reflection 15 of the source point 1 as reflected by the known interface 9. This reflection 15 in the image corresponds directly to the point of incidence 14 as seen by the image acquisition device 2.

Another incident ray coming from the source point 1 is deflected by the known interface 9 at a point of incidence 19 so as to be transmitted to the specular surface element 4 of the interface 6 that is to be determined at a point of incidence 12 in order to give rise to a ray 18 that is reflected on the interface 6 that is to be determined and that presents a degree of polarization $\rho r$. The angle formed between the transmitted incident ray and the normal 5 to the surface element 4 is equal to the angle formed between the reflected ray 8 and the normal 5 of the surface element 4. The reflected ray 8 is subjected to deflection at the known interface 9 at a transmission point 16. The image J acquired by the image acquisition device 2 also includes the light point, i.e. the reflection 13 of the source point 1 as reflected by the interface 6 that is to be determined. This deflection 13 of the image corresponds directly to the transmission point 16 of the known interface 9 as seen by the image acquisition device 2.

FIG. 3 shows the principle of the invention when no interface is interposed between the light source B and the interface 6 that is to be determined or characterized. The image processor unit locates any reflection 13 in the image of the light source as reflected by the interface 6 that is to be determined. The image processor unit calculates the light ray 3 arriving at the image-forming device 2 together with at least its degree of polarization ρ as its polarization parameter.

It should be observed that the point of incidence 12 on the interface 6 that is to be determined is situated along this light ray 3 reaching the image-forming device 2. Even if the position of the source point 1 producing the associated incident ray is known, the orientation of the incident ray is not known so there exists an infinity of possible positions for the point of incidence 12, given the ambiguity of the normal/position pair. However, in contrast, there exists only one position d for a given orientation of the normal 5, or indeed only one orientation of the normal 5 for a given position d along the ray. In the description below, the point of incidence 12 on the interface 6 that is to be determined is considered as being situated at a distance d along the ray 8 reflected on the interface 6 that is to be determined.

It should be observed that in the implementation shown in FIG. 3, the light ray 8 reflected on the interface 6 that is to be determined corresponds to the light ray 3 reaching the image-forming device 2. Furthermore, from the reflected ray 8, i.e. the ray 3 reaching the image-forming device 2, from its degree of polarization ρ, and from the known position of the source point 1, the processor unit deduces the position d and the orientation 5 of the surface element 4 at the point of incidence 12 on the interface 6 that is to be determined. The three-dimensional position of the point of incidence 12 is thus determined.

Figure 10:
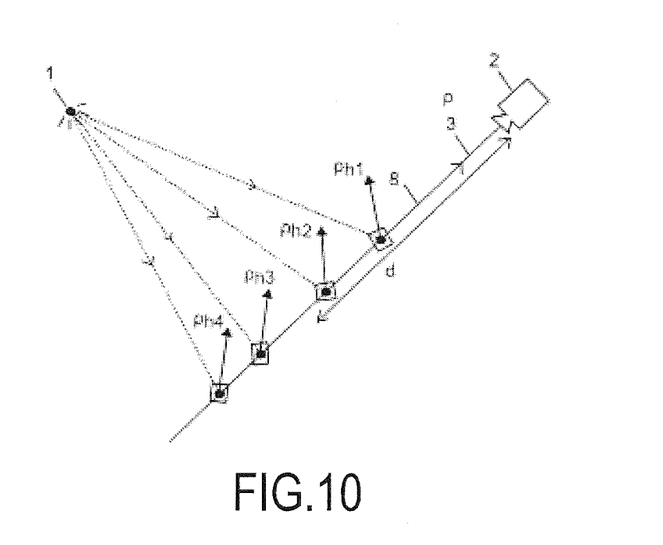
FIG. 10 shows an example of ray tracing for calculation when no known interface is interposed between the source and the interface that is to be determined.

FIG. 10 shows an implementation of a method for determining the distance d. For each hypothetical distance dhi, the incident ray from the light source 1 is calculated and then, at the point of incidence, the orientation of the normal to the surface element of the interface corresponding to this hypothesis is calculated, and then, e.g. by using Stokes-Mueller formalism, the hypothetical degree of polarization ρhi is calculated for the ray as reflected in this hypothesis. The distance d that is retained is the distance for which the hypothetical degree of polarization ρhi is equal to the real degree of polarization ρ as measured.

Figure 12:
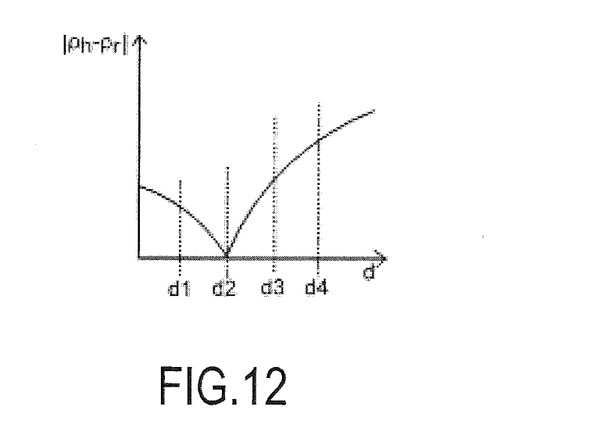
FIG. 12 is an example of a graph showing how the function giving the absolute value of the difference between the degree of polarization of the ray reflected on the interface that is to be determined and the assumed degree of polarization varies as a function of distance.

FIG. 12 is an example of a graph showing the variation as a function of distance d of the function giving the absolute value of the difference between the degree of polarization ρr of the ray 8 reflected on the interface 6 that is to be determined and the hypothetical degree of polarization ρh.

This function has a minimum that is situated at the distance d that corresponds to the real distance of the surface element forming part of the interface 6 that is to be determined. For example, four surface elements are positioned that correspond to four distances d: d1, d2, d3, and d4, associated with four respective hypothetical degrees of polarization ρh1, ρh2, ρh3, and ρh4. In FIG. 10, there can be seen four distances and four degrees of polarization. The minimum of the function is situated at d=d2. It is thus this distance $d_2$ that corresponds to the real position of the surface element 4, i.e. to the point of incidence 12. There thus exists a single solution d in the range under consideration that enables d to be determined exactly, and furthermore, since all of the rays and the degrees of polarization have been determined, the normal to the surface element of the interface at the point of reflection situated at the distance d is also known.

In the implementation shown in FIG. 3, the light source B has a single source point 1. Naturally, and as shown in FIG. 5, it is possible to illuminate the interface 6 that is to be determined with a light source B that has a plurality of source points 1 of positions that are known in three dimensions and that can be identified in the image. In this variant implementation, the reflections 13 from each of the source points 1 are analyzed in the manner described above, and the positions and the orientations of a plurality of surface elements 4 distributed over a plurality of locations of the interface 6 that is to be determined are themselves determined using the method in accordance with the invention.

It should be observed that in another variant implementation, it is possible to envisage illuminating the interface 6 that is to be determined with one or more lines of light enabling the positions and the orientations of a plurality of surface elements to be determined that are distributed along the reflection(s) of the line(s) on the interface 6 that is to be determined. In this implementation, consideration is given to the line(s) of light as constituting one or more sets of remarkable source points 1 and the lines of light obtained by the camera 2 are analyzed by considering them likewise as being sets of image points 15 or 13, whereas in reality, since the line and its images are continuous, at least locally, the method operates correctly only for certain types of surface, e.g. surfaces of curvature that is small in the direction parallel to the line of light.

Figure 7:
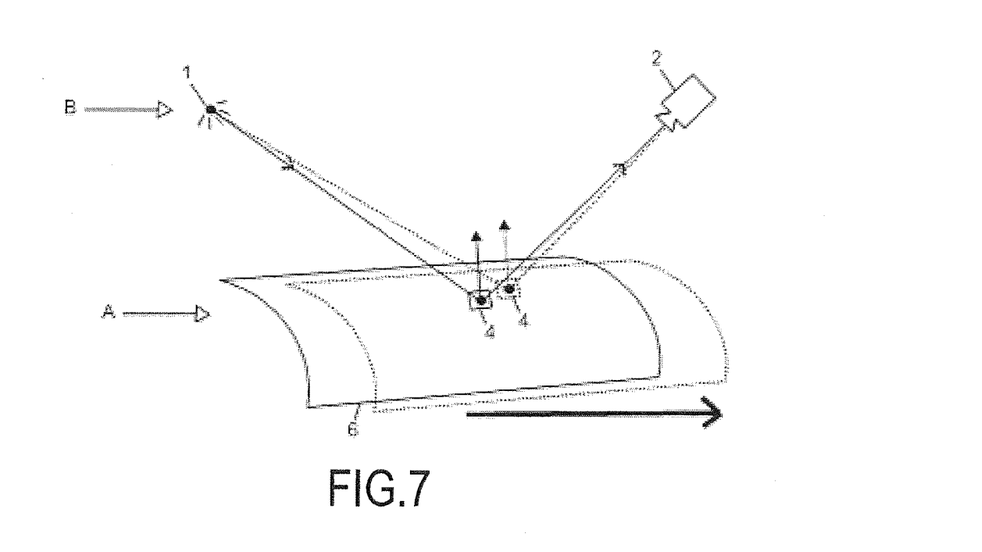
FIG. 7 is a diagram showing the article moving relative to the source and/or to the camera that, by scanning, makes it possible to determine a plurality of surface elements on the interface that is to be determined.

FIG. 7 shows another implementation for determining a plurality of surface elements 4 of the interface 6 that is to be determined, in which the article A is moved relative to the light source B and/or the image-forming device 2. While the article A is being moved, a plurality of successive images are acquired, thus making it possible by scanning to determine the positions and the orientations of a plurality of surface elements 4 distributed at a plurality of locations on the interface 6 that is to be determined.

Figure 8:
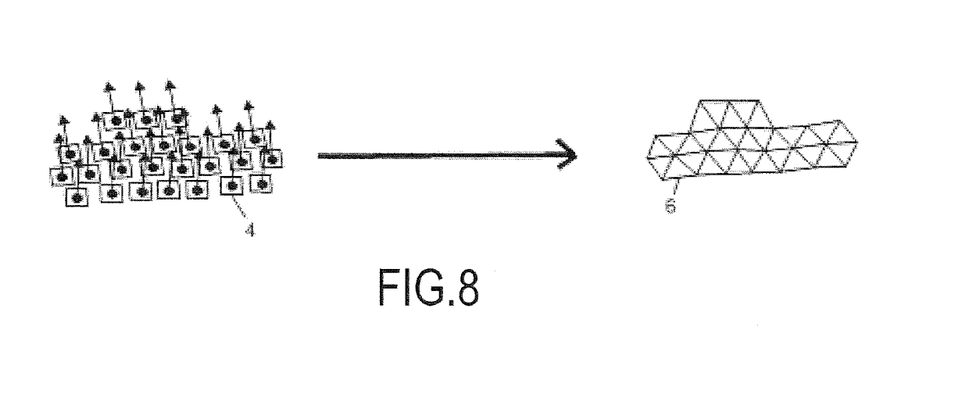
FIG. 8 is a diagram showing how a portion of the surface of an interface is reconstructed from a plurality of surface elements.

Naturally, the surface elements 4 are selected so as to reconstruct the three-dimensional shape of at least a portion or indeed of all of the interface 6 that is to be determined, as shown in FIG. 8.

FIG. 4 shows the principle of the invention when a known interface 9 is interposed between the light source B and the interface 6 that is to be determined or characterized. In the image J, the image processor unit locates any reflection 13 of the light source 1 as reflected by the interface 6 that is to be determined. The image processor unit calculates the light ray 3 reaching the image-forming device 2 together with at least its degree of polarization ρ, as the polarization parameter.

The processor unit calculates the light ray 8 that is reflected on the interface 6 that is to be determined at the point of incidence 12 on the basis of the light ray 3 reaching the image-forming device 2 and by calculating its deflections, and, e.g. using Stokes-Mueller formalism, it calculates the changes to polarization ρr induced by passing through the known interface 9 situated between the interface 6 that is to be determined and the image-forming device 2.

Thereafter, the invention consists in using the light ray 8 reflected on the interface 6 that is to be determined, its polarization parameter ρr, the known position of the source point 1, and the known interface 9 interposed between the source point 1 and the interface 6 that is to be determined, to deduce the position d and the orientation 5 of the surface element 4 at the point of incidence 12 on the interface 6 that is to be determined.

Figure 11:
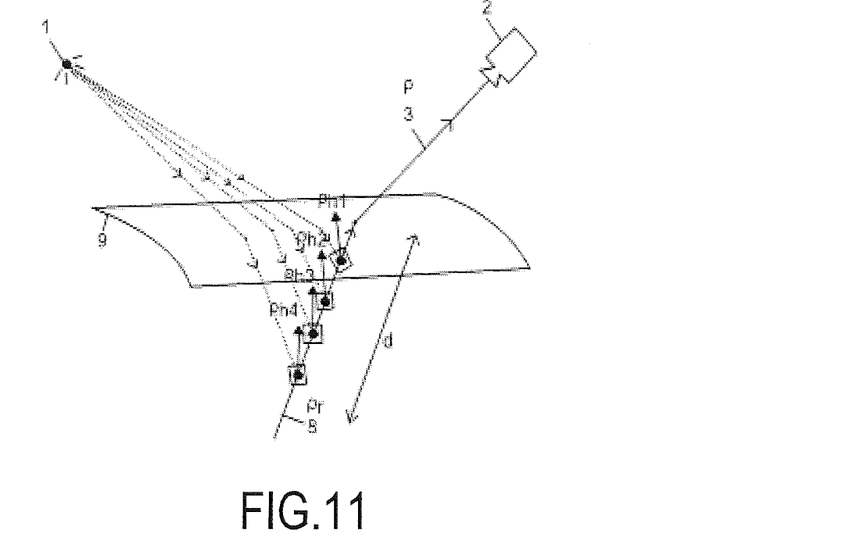
FIG. 11 is an example of ray tracing for calculation when a known interface is interposed between the source and the interface that is to be determined.

FIG. 11 shows an implementation of a method for determining the distance d along the light ray 8. For each hypothetical distance dhi, the incident ray coming from the light source 1 is calculated while taking account of its deflection by the known interface 9, and then at the point of incidence, the orientation of the normal of the surface element of the interface 6 that is to be determined that corresponds to this hypothesis is calculated, and then, e.g. using Stokes-Mueller formalism, the hypothetical degree of polarization ρhi of the reflected ray is calculated for this hypothesis. The distance d that is retained is the distance for which the hypothetical degree of polarization ρhi is equal to the calculated degree of polarization ρr.

As described above with reference to FIGS. 10 and 12, this method makes it possible to determine the real position of the surface element 4 at the point of incidence 12.

Naturally, the principle of the invention may be used to characterize an article having two superposed interfaces that are not known a priori. In this example, and as can be seen more precisely from FIG. 9, the method consists initially in characterizing the outer interface, i.e. the interface through which the incident ray passes initially, and then the inner interface while considering that the outer interface is known. Thus, in order to determine the surface element 12 belonging to the inner interface 6, the method begins by determining the surface element 18 of the first interface through which the rays pass by taking account of the reflection 15 on the first interface. Thereafter, the approximation is made that this interface is locally plane and it is considered as being known in order to make it possible to determine the surface element 12 that belongs to the second interface 6.

In practice, in the acquired image, there can be seen the reflections 13 and 15 of the source point 1 as reflected on the two interfaces, and the positions of these reflections in the image are detected and the degrees of polarization associated with each of the reflections are measured, and use is made of the data coming from the reflection on the first interface to determine a surface element of the first interface, and it is then assumed that the first interface is locally plane while making use of the data coming from the second reflection to determine both the normal at the point of the second interface and the three-dimensional position of that point. The outer interface is characterized using the method described with reference to FIGS. 1 and 3, while the inner interface is characterized using the technique described with reference to FIGS. 2 and 4.

Figure 9:
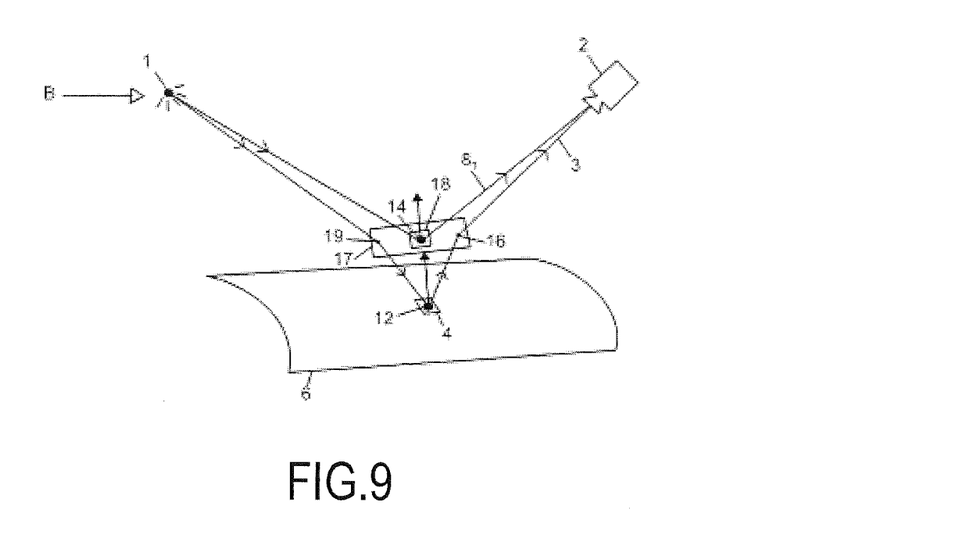
FIG. 9 is a diagram showing how two superposed interfaces belonging to an article are reconstructed.

More precisely, as explained above, the method seeks to detect the position in the image J of the first reflection 15, thereby making it possible to calculate the light ray $8_1$ reaching the image acquisition device 2 and coming from the surface 18 of the first interface, from the point of incidence 14. This point of incidence 14 is situated somewhere along the light ray 3.

In order to raise the normal/position ambiguity, the degree of polarization associated with this first reflection is measured, thus making it possible to calculate the orientation of this surface element 18, i.e. its normal, in order to raise the uncertainty. The three-dimensional position of the point of incidence 14 is calculated.

For the second reflection 13 in the image J, the position of the point of light corresponding to the second reflection in the image is determined and the light ray 3 reaching the image acquisition device 2 is calculated. It is assumed that the outer surface is locally plane. This assumption is true when the distance between all of the points 19, 14, and 16 (i.e. the points of incidence 19 and 14 and the point of transmission 16) is small and when the local radius of curvature of the surface is large. This assumption makes it possible to take into consideration a local outer surface portion 17 as being the extension of the surface element 18 around the point of incidence 14, and then to calculate the point of intersection between the ray 3 reaching the image-forming device and that local surface, i.e. the transmission point 16 of the ray reflected by the surface element 4 of the inner interface.

Since the surface 17 is considered as being locally plane, it is considered that the normal is the same at the point of incidence 14 and at the transmission point 16. Knowing the refractive index, it is thus possible to calculate the ray 8 reflected by the inner interface 6. Once more, the point of incidence 12 on the inner interface 6 is situated somewhere along this light ray. As explained above, there is ambiguity between the normal and the position of the point of incidence 12.

The degree of polarization associated with this second reflection is measured. The degree of polarization measured for the ray entering into the image acquisition device 2 corresponds to passing through three interfaces in succession. Each passage through an interface or diopter has an influence on the final degree of polarization, it being understood that the transmissions have much less influence than the reflection. It thus appears to be impossible to measure directly the orientation of the inner surface since the influence of the first transmission is not known.

In order to take this transmission into account, optimization is performed as explained above in order to determine the distance d between the point of transmission 16 and the point of incidence 12. It is then possible to obtain the position of the point of incidence in three dimensions and also the normal to the point of incidence.

In general manner, for a series of superposed interfaces, the method consists in determining the position and the orientation of at least one surface element of the interface that is to be determined, after previously using the same method of calculation by approximation to determine, in succession and in the reverse order of passage by the reflected ray, the positions and the orientations of the surface elements of the interfaces through which the rays pass in succession.

In another implementation, for a series of superposed interfaces, the method consists in determining the position and the orientation of at least one surface element of an interface that is to be determined, after previously reconstructing the three-dimensional shape of surface portions of the interfaces through which the rays pass in succession in the reverse order of passage by the reflected rays, thus making it possible, instead of using the assumption that the surface is locally plane, to take account of said three-dimensional shape for the surface 9 around the points 19, 14, and 16 (i.e. the points of incidence 19 and 14 and the point of transmission 16), thereby leading to better accuracy, in particular when the curvature is not negligible.

The invention thus consists in reconstructing the three-dimensional path followed by light rays from the light source with the help of measuring the degree of polarization in order to raise the uncertainties. This technique makes it possible to omit measuring the angle of polarization of the light. This technique requires knowledge of the refractive index of the material constituting the article, both for calculating the retracted rays and for having a model relating the degree of polarization and the orientation of the surface element of the interface.

Naturally, the method of the invention that enables the positions and the orientations of two surface elements of two successive interfaces to be determined makes it possible to determine the thickness of the transparent material between the two surface elements of the two interfaces.

Likewise, the method of the invention makes it possible to determine the thickness distribution of the transparent material situated between the surface portions of two consecutive interfaces by determining the three-dimensional shape of a portion of the first interface and the three-dimensional shape of a portion of the second interface.

The invention claimed is:

1. A method of determining a position and an orientation of at least one specular surface element forming an interface of an article (A) having one or more superposed interfaces, the method comprising:
   illuminating the interface (6) that is to be determined with at least one non-polarized diffuse light source point (1), the position of said at least one non-polarized diffuse light source point (1) being known in three dimensions;
   using an image-forming device (2) to acquire at least one image (J) enabling polarization information to be determined about a reflection(s) of the at least one non-polarized diffuse light source point on the interface that is to be determined; and
   in the image (J), locating any reflection (13, 15) of the at least one non-polarized diffuse light source point (1) as reflected by the interface (6) to be determined, and for each located reflection:
      calculating a light ray (3) reaching the image-forming device (2) together with at least its degree of polarization ($\rho$) as its polarization parameter;
      calculating a light ray (8) as reflected on the interface (6) that is to be determined from the light ray (3) reaching the image-forming device (2) by calculating deflections of the light ray (8) and changes of polarization ($\rho r$) induced on passing through any other known interface (9) situated between the interface (6) that is to be determined and the image-forming device (2); and
      using the light ray (8) reflected on the interface (6) that is to be determined, a polarization parameter ($\rho r$) of the light ray (8), the known position of the at least one non-polarized diffuse light source point (1), and any known interface (9) interposed between the at least one non-polarized diffuse light source point (1) and the interface (6) to be determined, to deduce the position (d) and the orientation (5) of the surface element (4) at a point of incidence on the interface that is to be determined.

2. A method according to claim 1, comprising illuminating the interface (6) that is to be determined with a plurality of light source points (1) of positions that are known in three dimensions and that are identifiable in the image, so that by analyzing reflections of each light source point (1), it is possible to determine positions and orientations of a plurality of surface elements distributed at a plurality of locations on the interface (6) that is to be determined.

3. A method according to claim 1, comprising illuminating the interface (6) that is to be determined with one or more lines of light making it possible to determine positions and orientations of a plurality of surface elements distributed along a reflection(s) of the line(s) on the interface that is to be determined.

4. A method according to claim 1, comprising moving the article (A) relative to the source (1) and/or to the image-forming device (2), and during the movement in acquiring a plurality of successive images, thereby making it possible by this scanning to determine positions and orientations of a plurality of surface elements distributed at a plurality of locations on the interface that is to be determined.

5. A method according to claim 1, comprising using a plurality of surface elements to reconstruct a three-dimensional shape of at least a portion of a surface of an interface of the article.

6. A method according to claim 1, comprising, for a series of superposed interfaces, determining a position and an orientation of at least one surface element of an interface that is to be determined after previously and successively in a reverse order of passage by the reflected ray using the same method to calculate by approximation positions and orientations of the surface elements of the interfaces through which the reflected rays pass in succession.

7. A method according to claim 1, comprising, for a series of superposed interfaces, determining a position and an orientation of at least one surface element of an interface that is to be determined by previously and successively in a reverse order of passage by the reflected ray reconstructing three-dimensional shapes of surface portions of the interfaces through which the reflected rays pass in succession.

8. A method according to claim 6, comprising, after determining positions and orientations of two successive elements of two successive interfaces, determining a thickness of a transparent material between the two successive elements of the two successive interfaces.

9. A method according to claim 8, comprising determining a thickness distribution of the transparent material situated between the surface portions of two consecutive interfaces by determining a three-dimensional shape of a portion of the first interface and a three-dimensional shape of a portion of the second interface.

10. A method according to claim 1, comprising acquiring as an image enabling polarization information to be determined, an image containing at all points intensity values of at least two components of a polarization vector of received light.

11. A device for determining a position and an orientation of at least one specular surface element forming an interface of an article (A) having one or more superposed interfaces, the device comprising:
   a diffuse and pluridirectional light source (B) illuminating the interface and including at least one source point (1) of known position;
   an image-forming device (2) suitable for supplying at least one image (J) enabling polarization information about received light to be determined, and positioned in such a manner as to receive reflections of the at least one source point on the interface that is to be determined; and
   an image processor unit;
   wherein the image processor unit:
      locates in the image (J) any reflection (13, 15) of the at least one source point as reflected by the interface that is to be determined, and in that, for each located reflection, the image processor unit:
      calculates a light ray (3) reaching the image-forming device (2) together with at least a degree of polarization of the light ray (3) as a polarization parameter;
      calculates a reflected light ray (8) as reflected on the interface that is to be determined from the light ray (3) reaching the image-forming device (2) by calculating deflections of the reflected light ray (8) and changes in polarization induced by passing through any other known interface situated between the interface (6) that is to be determined and the image-forming device (2); and from the reflected light ray (8) reflected on the interface (6) that is to be determined, from a polarization parameter of the reflected light ray (8), from the known position of the at least one source point (1), and from any known interface interposed between the at least one source point (1) and the interface that is to be determined, deduces a position and an orientation of the surface element at a point of incidence on the interface that is to be determined.

12. A device according to claim 11, wherein the light source (B) presents a plurality of light points of known positions, said points forming a set of disjoint point sources or a set of remarkable points of two-dimensional geometrical patterns carried on a light-emitting surface.

13. A device according to claim 11, wherein the light source (B) presents at least one line of light.

14. A device according to claim 11, wherein the article (A) is movable relative to the source (B) and/or to the image-forming device (2).

15. A device according to claim 11, wherein the image-forming device (2) supplies at least two polarization components for each pixel by means of at least two sensing surfaces that are exposed simultaneously, first receiving rays filtered by a polarizer oriented in a first direction and second receiving rays filtered by a polarizer oriented in a second direction.

16. A device according to claim 11, wherein the image-forming device (2) supplies at least two polarization components for each pixel by means of a sensing surface that is exposed at least twice, a first time to receive rays filtered by a polarizer oriented in a first direction, and a second time to receive rays filtered by the polarizer oriented in a second direction, an orientation of an axis of the polarizer being modifiable mechanically by rotation or electrically by controlling a liquid crystal device.

17. A device according to claim 11, wherein the image-forming device (2) includes a matrix sensing surface having a matrix filter placed thereon in which unit filters are oriented in at least N different directions, where N is greater than or equal to 2, so as to measure polarization parameters of light reaching the matrix sensing surface by combining N neighboring pixels.

* * * * *